United States Patent
Hudson

(10) Patent No.: US 9,506,341 B2
(45) Date of Patent: Nov. 29, 2016

(54) TRANSMITTING POWER THROUGH A WELLHEAD USING AT LEAST ONE TOROID

(75) Inventor: Steven Martin Hudson, Sturminster Newton (GB)

(73) Assignee: Expro North Sea Limited, Reading (GB)

( * ) Notice: Subject to any disclaimer, the term of this patent is extended or adjusted under 35 U.S.C. 154(b) by 259 days.

(21) Appl. No.: 14/129,737

(22) PCT Filed: Jun. 19, 2012

(86) PCT No.: PCT/GB2012/000531
§ 371 (c)(1),
(2), (4) Date: Apr. 15, 2014

(87) PCT Pub. No.: WO2013/001262
PCT Pub. Date: Jan. 3, 2013

(65) Prior Publication Data
US 2014/0218208 A1    Aug. 7, 2014

(30) Foreign Application Priority Data

Jun. 27, 2011   (GB) .................. 1110933.7

(51) Int. Cl.
G08B 21/00 (2006.01)
E21B 47/12 (2012.01)
G01V 3/34 (2006.01)

(52) U.S. Cl.
CPC ............ *E21B 47/12* (2013.01); *E21B 47/122* (2013.01); *G01V 3/34* (2013.01)

(58) Field of Classification Search
CPC ........ E21B 47/12; E21B 47/122; G01V 3/34
USPC ..................................... 340/854.9
See application file for complete search history.

(56) References Cited

U.S. PATENT DOCUMENTS

| 3,793,632 | A | 2/1974 | Still |
| 4,605,268 | A | 8/1986 | Meador |
| 6,392,561 | B1* | 5/2002 | Davies ............ E21B 4/02 340/853.3 |
| 2002/0036085 | A1* | 3/2002 | Bass ............ E21B 17/003 166/250.01 |
| 2005/0046588 | A1* | 3/2005 | Wisler ............ E21B 47/122 340/854.6 |
| 2005/0285753 | A1 | 12/2005 | Shah et al. |
| 2008/0007422 | A1* | 1/2008 | Hudson ............ G01V 11/002 340/854.4 |
| 2008/0253230 | A1* | 10/2008 | Thompson ............ E21B 47/122 367/129 |
| 2011/0024103 | A1 | 2/2011 | Storm, Jr. et al. |

FOREIGN PATENT DOCUMENTS

| WO | 01/65069 A1 | 9/2001 |
| WO | 0165069 | 9/2001 |

OTHER PUBLICATIONS

International Search Report for International Application No. PCT/GB2012/000531, dated Apr. 16, 2013.
EP search report for EP14177125.3 dated Dec. 4, 2014.
International Preliminary Report on Patentability issued by the European Patent Office for corresponding International Application No. PCT/GB2012/000531, dated Jan. 7, 2014.

* cited by examiner

Primary Examiner — Mark Rushing

(57) ABSTRACT

An impressed current cathodic protection arrangement includes an elongate metallic structure to be protected and cathodic protection apparatus which comprises a DC power supply and an anode. One terminal of the power supply is connected to the structure at a connection point and another terminal of the power supply is connected to the anode. The arrangement includes monitoring apparatus for monitoring effectiveness of cathodic protection provided by the cathodic protection apparatus by determining the electrical potential of the structure relative to surroundings at at least one location which is spaced from the connection point.

18 Claims, 2 Drawing Sheets

TRANSMITTING POWER THROUGH A WELLHEAD USING AT LEAST ONE TOROID

CROSS REFERENCE TO RELATED APPLICATIONS

This application is a 371 National Phase of PCT/GB2012/000531 filed Jun. 19, 2012, and published in English on Jan. 3, 2013 as WO 2013/001262 A2, and which claims priority from UK Patent Application No. 1110933.7 filed on Jun. 27, 2011, the entire disclosures of which are incorporated herein by reference.

This invention relates to downhole signalling systems and methods.

There is a general desire to transmit data within well installations and in particular to transmit data between the surface and components provided downhole in the well. This data may be control data from the surface used to control the component provided downhole in the well or may be data concerning measurements which have been made downhole in the well which is to be extracted. As an example there may be a permanent downhole gauge (PDG) provided in the well to make pressure and temperature measurements and a signalling system provided to allow data relating to these measurements to be transmitted to the surface.

Various different techniques exist for transmitting data in well installations. The applicants of the present application commercially supply systems for wireless electrical signalling in wells where the metallic structure of the well installation itself that is, for example, production tubing, casing, linings and well heads, is used as the signal channel.

Whilst such signal transmission techniques can be advantageous, particularly in open hole situations, there can be circumstances where signals transmitted solely through the metallic structure of the well become weak, or there are electrical discontinuities in the metallic structure provided within the well.

Similarly there are situations where it is desirable to transmit electrical power downhole into the well, rather than relying on a local, downhole, power source.

In some situations it can be necessary or desirable to transmit power and/or signals between the surface and a downhole location without a penetrator for carrying a cable through the well head being provided. This may, for example, be because an existing well head is being reused at a time when an additional component, such as an additional PDG, is being installed downhole into the well.

The present invention is aimed at providing (power and data) signalling systems and methods which are useful in at least some of the above situations.

According to one aspect of the present invention there is provided a downhole signalling system for electrical signalling, in a well installation having metallic structure, between a first, downhole, location and a second location which is remote from the first location, comprising a first unit provided at the first location, a second unit provided at the second location which unit is arranged to at least one of apply signals to and receive signals from the metallic structure, a first magnetic material toroid provided around downhole metallic tubing of the metallic structure and located at a third location between and spaced from the first location and the second location, and a winding wound around the magnetic material toroid, wherein the winding is connected to a cable which runs alongside the metallic tubing away from the toroid and towards the first unit and the first unit is arranged to at least one of apply signals to and receive signals from the metallic tubing via the cable and the magnetic material toroid to allow signalling between the first and second units.

It will be appreciated that the expression toroid used in respect of the magnetic material toroid does not imply that the toroid must have any perfect geometrical shape. The expression is used to refer to a generally ring shaped piece of magnetic material irrespective of the actual shape of the ring or the cross section of the material making up the ring.

The winding can serve to step up the voltage of signals in the metallic structure for application to the cable and/or conversely step down the voltage of signals in the cable for application to the metallic structure. Typically the winding will have many turns—say in excess of 100 turns and preferably in the order of 1000 turns.

The cable may be electrically connected directly to the first unit.

The signalling system may comprise a second magnetic material toroid carrying a respective winding, the second toroid being provided around respective downhole metallic tubing of the metallic structure and located at a fourth location between and spaced from the first location and the third location.

The cable may be connected to the winding of the second magnetic material toroid. The cable may run alongside the metallic tubing between the first and second magnetic material toroids.

The first unit may be arranged to at least one of apply signals to and receive signals from metallic structure in the region of the first unit. The system may be such that signals travel between the first unit and the second unit via, sequentially, in the appropriate direction, metallic tubing in the region of the first unit, the second magnetic material toroid, the cable, the first magnetic material toroid and metallic structure in the region of the second unit.

In such a case the two toroids, the respective windings, and the connecting cable can act together as a passive signalling relay. Here it will be appreciated that the first unit is arranged to apply signals to and/or receive signals from the metallic tubing in the region of the first toroid indirectly i.e. via the second toroid and the metallic tubing in the region of the second toroid as well as via the cable and the first toroid.

The metallic structure may comprise a portion with two runs of metallic tubing running one within the other and forming an annulus therebetween. In such a case the cable may run, for at least part of its length, within the annulus.

The first magnetic material toroid may be located in the annulus.

Where there are two magnetic material toroids, the second toroid may be located within the annulus and adjacent the lowermost end of the portion of the metallic structure with two runs of metallic tubing.

Typically where there are two runs of metallic tubing one within the other, the inner tubing will be production tubing and the outer tubing will be a casing or liner. Further typically the second toroid may be located adjacent a packer at the end of the casing or liner.

The metallic structure in the region of the first unit may or may not be electrically continuous with the metallic structure in the region of the second unit. Thus the cable might be being used to bridge an electrical discontinuity in the metallic structure and/or be being used to provide a signal channel that is better than that provided by the metallic structure itself. This applies both to configurations with one toroid and configurations with two toroids.

In at least some embodiments, the second location is outside the well borehole beyond the wellhead and the second communication unit is electrically connected to the wellhead.

The third location may be downhole in the well borehole but adjacent to, close to, or in the region of the wellhead.

The spacing between the first location and the third location will typically be a spacing along the metallic tubing. The spacing may be in excess of 100 meters, and more typically several hundred meters or more. Correspondingly the cable will have at least such a length.

Typically the first location will be deeper, and significantly deeper—for example in excess of 100 meters deeper—in the well borehole than the third location.

The spacing between the third location and the fourth location will typically be a spacing along the metallic tubing. The spacing may be in excess of 100 meters, and more typically several hundred meters or more. Correspondingly the cable will have at least such a length.

The first unit may comprise or be located adjacent to a permanent downhole gauge.

The first unit comprise a communications unit. The second unit may comprise a communications unit.

The first unit may comprise at least one of a receiver and a transmitter. The second unit may comprise at least one of a receiver and a transmitter.

The electrical signals may be data carrying signals.

The electrical signals may be electrical power signals. The system may be arranged for transmitting electrical power from the second unit to the first unit.

The first unit may comprise charge storage means for storing power transmitted to it. The system may be a power transmission system.

The metallic tubing around which the or each toroid is located may have a greater wall thickness than the tubing at regions away from the or each toroid.

Insulating centralisers may be provided around the metallic tubing in the region of the first toroid and/or the second toroid. The insulating centralisers may be arranged to avoid electrical contact between the metallic tubing which the centralisers surround and surrounding metallic structure over a distance of at least say 100 meters away from one or both sides of the or each toroid.

The cable may be tubing encased cable—TEC cable. The cable should have as low resistance as practically possible.

According to another aspect of the present invention there is provided a well installation comprising downhole metallic structure and a downhole signalling system as defined above.

According to a further aspect of the present invention there is provided a downhole signalling method using a downhole signalling system as defined above.

According to a yet further aspect of the present invention there is provided passive relay apparatus for use in a downhole signalling system, the relay apparatus comprising:
  a first magnetic material toroid for location around downhole metallic tubing and having a winding wound around the magnetic material toroid,
  a second magnetic material toroid for location around downhole metallic tubing and having a winding wound around the magnetic material toroid, and
  a cable which is one of connected between and connectable between the respective windings of the first and second magnetic material toroids and arranged for running alongside metallic tubing between the first and second magnetic material toroids when installed.

According to a further aspect of the present invention there is provided a method of installing a downhole signalling system as defined above in a well installation comprising the steps of selecting at least one of: the number of turns of the winding, the dimensions of the winding, a frequency of the applied signals, and a modulation scheme of the applied signals in order to optimise the system.

The method may further comprise installing tubing having greater wall thickness in the region of the or each magnetic material toroid and/or installing non-conducting centralisers in the region of the or each magnetic material toroid.

Embodiments of the present invention will now be described, by way of example only, with reference to the accompanying drawings in which.

Figure 1:
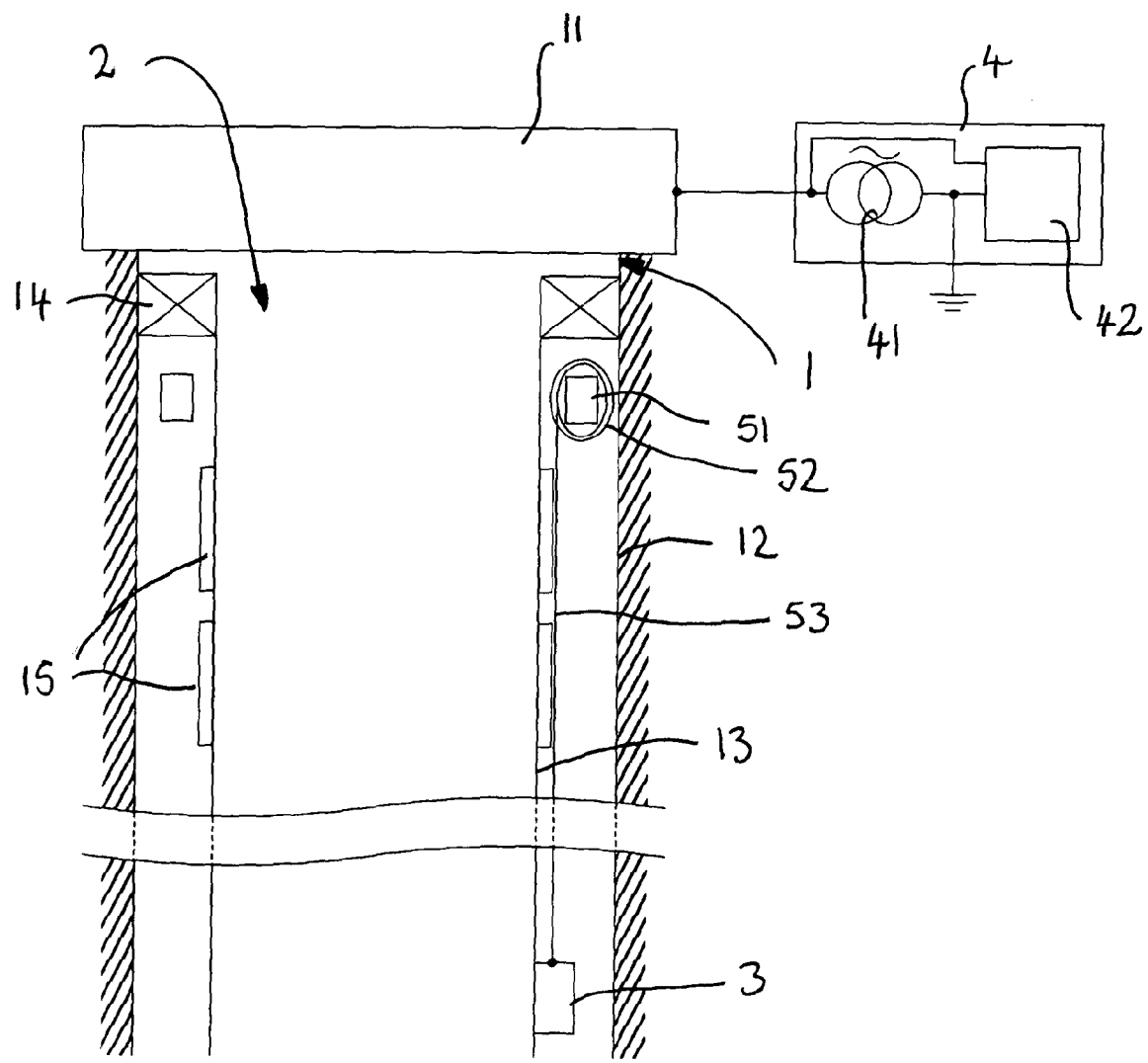
FIG. 1 shows a well installation including a downhole signalling system.

FIG. 1 shows a well installation comprising metallic structure 1 provided in a bore hole 2. The metallic structure comprises a well head 11, casing 12 lining the bore hole and tubing 13 provided within the casing 12. Thus an annulus is defined between the outer surface of the tubing 13 and the inner surface of the casing 12.

A permanent downhole gauge (PDG) 3 (representative of a first unit) is provided at a first location downhole in the well. A second, surface, unit 4 is provided at a second location which is at the surface and outside of the well.

The surface unit 4 has one terminal connected to ground (which might be a connection to another well) and another terminal connected to the well head 11. The surface unit 4 comprises an electrical power signal generator 41 for applying electrical signals to the metallic structure 1 via the well head 11, and further comprises a control unit 42 including a data detector. Thus the surface unit 4 is arranged for applying power to the metallic structure 1 which may be picked up by the permanent downhole gauge 3 and is also arranged to receive data relating to measurements made by the permanent downhole gauge 3.

At a third location which is between the first and second locations, and in particular, is downhole in the well but adjacent to the well head 11, there is provided a magnetic material toroid 51. The toroid 51 is provided in the annulus so as to surround the tubing 13, but be within the casing 12. Wound around the magnetic material toroid 51 is a winding 52. Ends of this winding 52 are connected via a suitable connector block to a cable 53 which runs alongside the tubing 13 down into the well and is connected directly to the permanent downhole gauge 3.

In the present embodiment the magnetic material toroid 51 is located adjacent to a tubing hanger 14 which supports the tubing 13 within the casing 12. The tubing hanger 14 must (and in nearly all typical wells will) provide good electrical conduction between the casing 12 and the tubing 13.

Insulating centralisers 15 are provided around the tubing 13 in the region of, and in this embodiment particularly below, the location at which the magnetic material toroid 51 is located. The insulating centralisers 15 may be provided over a length of approximately 100 meters of the tubing 13 to prevent, as far as is practical, electrical contact between the tubing 13 and casing 12 in the region of the magnetic material toroid.

The cable 53 may be tubing encapsulated cable (TEC) with the central conductor thereof connected to one end of the winding 52 and the shielding connected to the other end of the winding 52. Alternatively, the cable 53 may be a twisted pair connected to respective ends of the winding.

In operation, when electrical power signals are applied by the electrical power signal generator 41 of the surface unit 4 to the well head, the resulting electrical power signals are transmitted through the well head 11 and into the remainder of the metallic structure including the casing 12, and in particular, the tubing 13. As the resulting current flows down the tubing 13 this will induce a respective current in the winding 52 provided around the magnetic material toroid 51. This signal can then propagate along the cable 53 to the permanent downhole gauge 3. Thus electrical power is transmitted from the surface unit 4 via the metallic structure 1 of the well and then the cable 53 so that this power may be used by the permanent downhole gauge 3.

In some embodiments the power may be used directly and instantaneously as it is received by the permanent downhole gauge 3. However in other circumstances charge storage means such as rechargeable batteries or super capacitors may be provided at the permanent downhole gauge 3 for storing electrical power delivered thereto.

Note that the electrical power signals applied to the metallic structure 1 will propagate down into the tubing and casing beyond the magnetic material toroid 51, but these signals will be subject to far higher losses than those injected into the cable 53. Hence the provision of the magnetic material toroid 51 and associated winding 52 and cable 53 can give rise to a better transmission of power signals down to the permanent downhole gauge 3 than a case where the metallic structure alone is relied upon as a signal channel.

The number of turns of the winding 52 may be chosen to suitably step up the voltage for application to the cable 53. Thus a high current alternating signal will be applied by the power signal generator 41 to the metallic structure 1 and this will be converted to a lower current, but higher voltage, signal for propagation along the cable 53.

The applied current might be in the order of tens of amps or even perhaps a hundred amps. The frequency of the signals applied might be in the range of 10-100 hertz. The number of turns of the winding 52 would generally be as large as practical and this may be perhaps a thousand turns. These typical operational values may lead to a voltage of perhaps 1000 volts in the cable 53.

As mentioned above, the same arrangement may be used for transmitting data as well as power. Thus data may be transmitted from the surface unit 4 down to the permanent downhole gauge 3 and similarly data may be transmitted from the permanent downhole gauge 3 back to the surface unit 4.

Where signals are transmitted from the permanent downhole gauge 3 to the surface unit 4, the signals are applied by the permanent downhole gauge 3 to the cable 53. The signal propagates along the cable 53 and excites the winding 52 which leads to a current being induced into the metallic structure 1, in particular the tubing 13. This will produce a detectable potential difference between the well head 11 and ground which may be detected by the data detector in the control unit 42 of the surface unit 4. Thus, for example, pressure and temperature measurements from the permanent downhole gauge 3 may be received at the surface unit 4.

In a preferred modification to the system, the thickness of the wall of the tubing 13 would be greater in the region of the magnetic material toroid 51 than elsewhere. Both this additional feature and the provision of the insulating centralisers 15 have the aim of increasing the effectiveness of transfer of signals between the tubing 13 in the region of the magnetic material toroid 51 and the winding 52.

When the current signalling system is used for power transmission, lower frequency signals are likely to be used than when the signalling system is being used for data transmission. Data transmission may be carried out using modulation schemes such as frequency shift keying and pulse position modulation. The current system is appropriate for providing readings perhaps once every ten seconds. In at least some implementations, power may be stored up in the period between each reading.

In implementing a signalling system of the current type in a given well installation, the frequency used, the number of turns of the winding, the overall dimensions of the winding/toroid, the length over which insulating centralisers are provided and the thickness of the tubing 13 may all be considered and varied where possible in order to achieve the desired functionality and/or performance.

Figure 2:
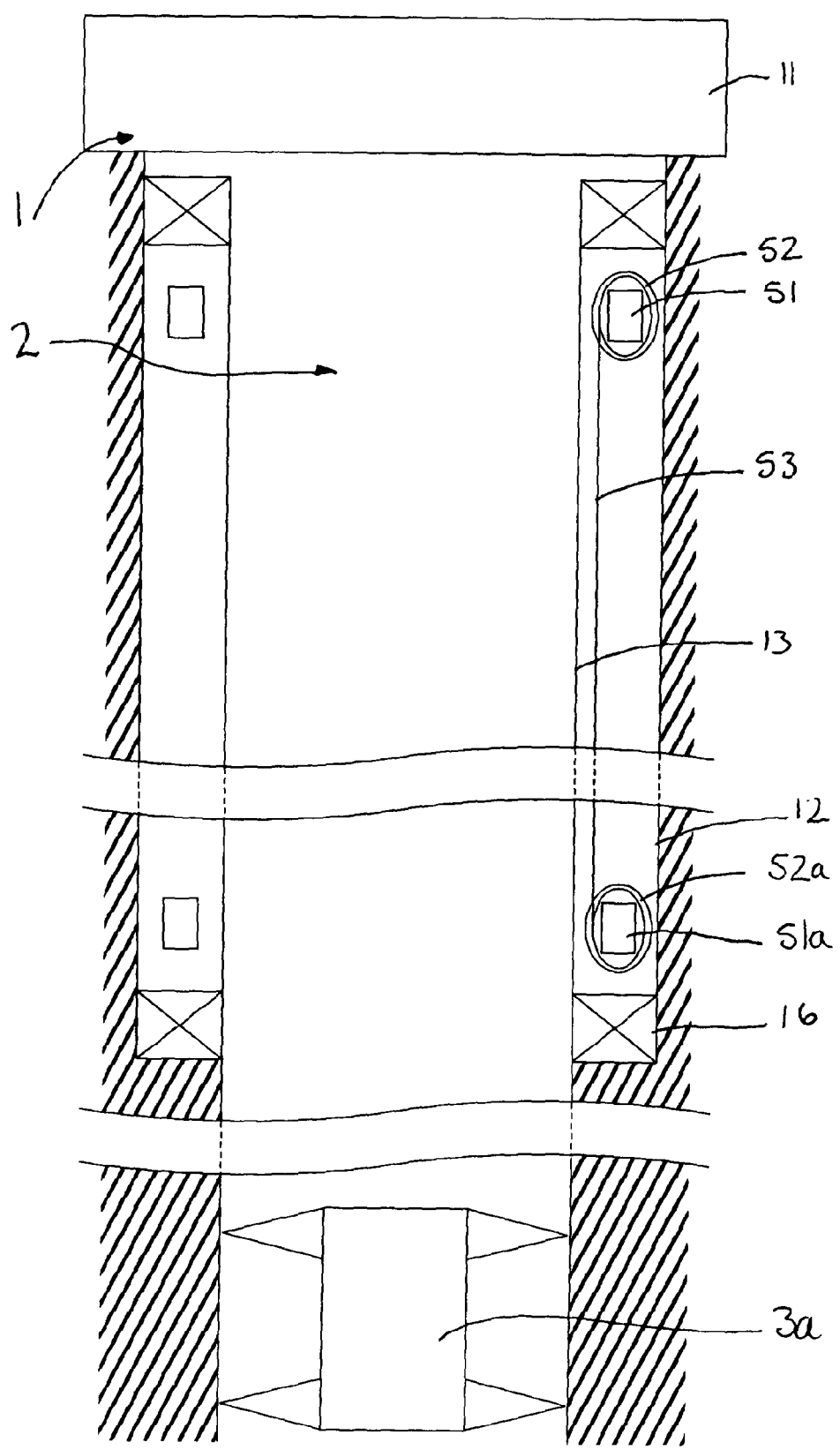
FIG. 2 shows a well installation including an alternative downhole signalling system.

FIG. 2 shows a well installation with a different downhole signalling system than that shown in FIG. 1, but using at least some of the same principles.

Again, metallic structure 1 is provided in a borehole 2. Further there will be a surface unit of the same type as shown in FIG. 1, but this is omitted from FIG. 2. Again there is a magnetic material toroid 51 with an associated winding 52 and a cable 53 leading away from this down into the well.

However in this instance, the cable 53 is connected to a winding 52a of a second magnetic material toroid 51a which is provided at a fourth location which is spaced away from the third location at which the first magnetic material toroid 51 is located.

Furthermore, rather than a permanent downhole gauge provided in the annulus between the tubing 13 and casing 12, in this instance a downhole tool 3a (representative of a first unit) is provided within the tubing 13 at a position further down in the well than the fourth location at which the second magnetic material toroid 51a is located.

In this embodiment power and/or data is to be transmitted between the downhole tool 3a and the surface unit (not shown). The downhole tool may be of a type commercially available from the applicants. This tool 3a is arranged for taking measurements such as pressure and/or temperature measurements and applying signals onto the metallic tubing 13 within which it is located.

Similarly, as in the embodiment shown in FIG. 1, the surface unit (not shown) may be used to apply power and/or signals to the metallic structure 1 which can be picked up by the downhole tool 3a.

Note that most normally the tool 3a will be located in an open hole location. That is to say in a position below which the casing 12 extends. On the other hand, in general terms the cable 53 and toroids 51, 51a will be provided in the region where there is casing so that these are protected within the annulus. Therefore, in at least some implementations, the most logical position for the second magnetic material toroid 51a will be just above the packer 16 where the casing 12 stops.

In operation, signals are transmitted from the tool 3a to the surface by virtue of the following stages. The tool 3a applies signals to the tubing 13 in the region of the tool 3a. These signals propagate up the tubing 13 towards the second magnetic material toroid 51a where the signals in the tubing 13 excite corresponding signals in the second winding 52a. These signals may then propagate along the cable 53 to the first winding 52. Here the winding 52 and magnetic material toroid 51 serve to induce signals into the metallic tubing 13 in the region of the first magnetic material toroid 51. Then these signals may propagate through the metallic structure, and in particular through the well head 11, so that they may be picked up by the surface unit (not shown). Of course signals may be transmitted along the same channel in the opposite direction through the same stages but in reverse.

Thus in this embodiment; the two magnetic material toroids 51, 51a, their associated windings 52, 52a and the connecting cable 53 act as a passive relay where signals may be picked up from the metallic tubing 13 in one location and reapplied to the metallic tubing 13 in a remote location.

Again the idea here is that the propagation of signals through the cable will be much better than through the metallic structure itself. Thus even though there will be losses in transferring signals into and out of the cable 53, the overall signal channel will be better than the metallic structure 1 alone.

Furthermore both of these types of arrangement may be used where there is an electrical discontinuity in the metallic structure at some point. That is to say that the cable 53 may be used to bridge any such electrical discontinuity.

Again the cable may be coaxial or twin cable in this case connected between the ends of the respective windings 52, 52a. Thus the shielding or one wire in the pair may be connected to one end of each winding and the central conductor or other wire in the pair may be connected to the other end of each winding.

The comments above with regard to the number of turns in the windings, the type of frequencies, voltages and currents and so on which may be used in the first embodiment are equally applicable to the second embodiment.

The invention claimed is:

1. A through wellhead downhole signalling system for electrical signalling, in a well installation having metallic structure, between a first, downhole, location and a second location which is remote from the first location and is outside the well borehole beyond a wellhead of the well, comprising
    a first unit provided at the first location, a second unit provided at the second location which second unit is outside the well borehole beyond a wellhead of the well and is electrically connected to the wellhead and arranged to at least one of apply signals to and receive signals from the metallic structure via the electrical connection of the wellhead,
    a first magnetic material toroid provided around downhole metallic tubing of the metallic structure and located at a third location which is in the well borehole in the region of the wellhead and between and spaced from the first location and the second location, and
    a winding wound around the magnetic material toroid,
    wherein the winding is connected to a cable which runs alongside the metallic tubing for at least 100 m away from the toroid and towards the first unit; and
    the first unit is arranged to at least one of apply signals to and receive signals from the metallic tubing via the cable and the magnetic material toroid, those signals being able to be communicated between the metallic structure and the cable using the magnetic material toroid provided around the downhole metallic tubing of the metallic structure so as to allow signalling between the first unit at a downhole location and the second unit outside of the wellbore and beyond the wellhead using the wellhead, the metallic structure and the cable.

2. A downhole signalling system according to claim 1 in which the cable is electrically connected directly to the first unit.

3. A downhole signalling system according to claim 1 in which the metallic structure comprises a portion with two runs of metallic tubing running one within the other and forming an annulus therebetween and at least one of:
    the cable runs, for at least part of its length, within the annulus; and
    the first magnetic material toroid is located in the annulus.

4. A downhole signalling system according to claim 1 in which the electrical signals are electrical power signals and the system is arranged for transmitting electrical power from the second unit to the first unit.

5. A downhole signalling system according to claim 1 in which the first unit one of: comprises, and is located adjacent to a permanent downhole gauge.

6. A downhole signalling system according to claim 1 in which the metallic structure in the region of the first unit is not electrically continuous with the metallic structure in the region of the second unit and the cable is used to bridge an electrical discontinuity in the metallic structure.

7. A downhole signalling system according to claim 1 which comprises a second magnetic material toroid carrying a respective winding, the second toroid being provided around respective downhole metallic tubing of the metallic structure and located at a fourth location between and spaced from the first location and the third location.

8. A downhole signalling system according to claim 7 in which the cable is connected to the winding of the second magnetic material toroid.

9. A downhole signalling system according to claim 7 in which the first unit is arranged to at least one of apply signals to and receive signals from metallic structure in the region of the first unit.

10. A well installation comprising downhole metallic structure and a downhole signalling system for electrical signalling, between a first, downhole, location and a second location which is remote from the first location and is outside the well borehole beyond a wellhead of the well, comprising
    a first unit provided at the first location,
    a second unit provided at the second location which is outside the well borehole beyond a wellhead of the well, the second unit is being electrically connected to the wellhead and arranged to at least one of apply signals to and receive signals from the metallic structure via the electrical connection of the wellhead,
    a first magnetic material toroid provided around downhole metallic tubing of the metallic structure and located at a third location which is in the well borehole in the region of the wellhead and between and spaced from the first location and the second location, and
    a winding wound around the magnetic material toroid,
    wherein the winding is connected to a cable which runs alongside the metallic tubing for at least 100 m away from the toroid and towards the first unit; and
    the first unit is arranged to at least one of apply signals to and receive signals from the metallic tubing via the cable and the magnetic material toroid, those signals being able to be communicated between the metallic structure and the cable using the magnetic material toroid provided around the downhole metallic tubing of the metallic structure so as to allow signalling between the first unit at a downhole location and the second unit outside of the wellbore and beyond the wellheads using the wellhead, the metallic structure and the cable.

11. A downhole signalling system according to claim 1 in which at least one of: the number of turns of the winding, the dimensions of the winding, a frequency of the applied signals, and a modulation scheme of the applied signals is selected in order to optimise the system.

12. A downhole signalling system for electrical signalling, in a well installation having metallic structure, between a first, downhole, location and a second location which is remote from the first location, comprising
a first unit provided at the first location,
a second unit provided at the second location which unit is arranged to at least one of apply signals to and receive signals from the metallic structure,
a first magnetic material toroid provided around downhole metallic tubing of the metallic structure and located at a third location between and spaced from the first location and the second location, and
a winding wound around the magnetic material toroid,
wherein the winding is connected to a cable which runs alongside the metallic tubing away from the toroid and towards the first unit and
the first unit is arranged to at least one of apply signals to and receive signals from the metallic tubing via the cable and the magnetic material toroid, those signals being able to be communicated between the metallic structure and the cable using the magnetic material toroid provided around the downhole metallic tubing of the metallic structure so as to allow signalling between the first unit and the second unit using the metallic structure and the cable,
wherein the downhole signalling system comprises a second magnetic material toroid carrying a respective winding, the second toroid being provided around respective downhole metallic tubing of the metallic structure and located at a fourth location between and spaced from the first location and the third location, and
the cable is connected to the winding of the second magnetic material toroid so that the first and second magnetic material toroids, the respective windings and the cable form passive relay apparatus with signals being picked up from the metallic tubing by one of the toroids and reapplied to the metallic tubing by the other of the toroids, and
the metallic structure comprises a portion with two runs of metallic tubing running one within the other and forming an annulus therebetween and the cable runs, for at least part of its length, within the annulus; and the first and second magnetic material toroids are located in the annulus.

13. A downhole signalling system according to claim 12 in which the metallic structure in the region of the first unit is not electrically continuous with the metallic structure in the region of the second unit and the cable is used to bridge an electrical discontinuity in the metallic structure.

14. A downhole signalling system according to claim 12 in which the electrical signals are electrical power signals and the system is arranged for transmitting electrical power from the second unit to the first unit.

15. A downhole signalling system according claim 12 in which the first magnetic material toroid is located in the region of a wellhead and the second magnetic material toroid is located in the region of a packer.

16. A downhole signalling system according to claim 12 in which the cable runs for at least 100 m alongside the metallic tubing.

17. A downhole signalling system according to claim 12 in which the first unit comprises a downhole tool provided within the downhole metallic tubing.

18. A well installation comprising downhole metallic structure and a downhole signalling system for electrical signalling, between a first, downhole, location and a second location which is remote from the first location, comprising
a first unit provided at the first location,
a second unit provided at the second location which unit is arranged to at least one of apply signals to and receive signals from the metallic structure,
a first magnetic material toroid provided around downhole metallic tubing of the metallic structure and located at a third location between and spaced from the first location and the second location, and
a winding wound around the magnetic material toroid,
wherein the winding is connected to a cable which runs alongside the metallic tubing away from the toroid and towards the first unit and
the first unit is arranged to at least one of apply signals to and receive signals from the metallic tubing via the cable and the magnetic material toroid, those signals being able to be communicated between the metallic structure and the cable using the magnetic material toroid provided around the downhole metallic tubing of the metallic structure so as to allow signalling between the first unit and the second unit using the metallic structure and the cable,
wherein the downhole signalling system comprises a second magnetic material toroid carrying a respective winding, the second toroid being provided around respective downhole metallic tubing of the metallic structure and located at a fourth location between and spaced from the first location and the third location, and
the cable is connected to the winding of the second magnetic material toroid so that the first and second magnetic material toroids, the respective windings and the cable form passive relay apparatus with signals being picked up from the metallic tubing by one of the toroids and reapplied to the metallic tubing by the other of the toroids, and
the metallic structure comprises a portion with two runs of metallic tubing running one within the other and forming an annulus therebetween and the cable runs, for at least part of its length, within the annulus; and the first and second magnetic material toroids are located in the annulus.

* * * * *